(12) United States Patent
Keltcher et al.

(10) Patent No.: US 7,139,897 B2
(45) Date of Patent: Nov. 21, 2006

(54) COMPUTER INSTRUCTION DISPATCH

(75) Inventors: Paul Keltcher, Sunnyvale, CA (US);
Gary Vondran, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 615 days.

(21) Appl. No.: 10/113,074

(22) Filed: Apr. 1, 2002

(65) Prior Publication Data
US 2003/0188132 A1    Oct. 2, 2003

(51) Int. Cl.
*G06F 15/00* (2006.01)
(52) U.S. Cl. .......................... 712/24; 712/211
(58) Field of Classification Search ................ 712/24, 712/211; 326/39
See application file for complete search history.

(56) References Cited

U.S. PATENT DOCUMENTS 5,761,470 A * 6/1998 Yoshida ...................... 712/210
6,415,376 B1 * 7/2002 Mohamed et al. ........... 712/24

OTHER PUBLICATIONS

Hastings et al., When is a Memory Not a Memory?, Electro/87 and Mini/Micro Northeast Conference Record, 1987.*

* cited by examiner

*Primary Examiner*—Richard L. Ellis
(74) *Attorney, Agent, or Firm*—Richard P. Lange

(57) ABSTRACT

Circuit arrangement and method for dispatching computer instructions. In a processor having a plurality of types of execution units, the computer instructions are grouped in bundles, and each bundle includes a plurality of instructions and an associated index code. Template values are stored in a plurality of template registers, and each template value specifies types of execution units for a bundle of instructions and those instructions in a bundle that are executable in parallel. A dispatch logic circuit is coupled to the template registers and is responsive to an input bundle of instructions and associated index value. The dispatch logic circuit reads a code from a selected one of the plurality of template registers referenced by the index value and issues one or more selected instructions in the bundle to at least one execution unit of a selected type responsive to the code read from the selected one of the plurality of template registers.

17 Claims, 3 Drawing Sheets

COMPUTER INSTRUCTION DISPATCH

FIELD OF THE INVENTION

The present invention generally relates to processing computer instructions, and more particularly to dispatching computer instructions to execution units of an instruction processor.

BACKGROUND

The central processing unit of a computer includes instruction processing circuitry for decoding and performing the function(s) specified by a computer instruction. Sophisticated instruction processing circuits often include multiple execution units that are specially adapted to process different types of instructions. Example execution units include a floating point unit, a branch unit, a memory-operation unit, and an integer arithmetic unit. Some processor architectures include multiple execution units of each type of execution unit to further enhance instruction-level parallelism.

Some architectures group instructions into bundles. For example, the IA-64 architecture from Hewlett-Packard forms bundles of three instructions. Based on dependency between instructions, as many as all the instructions in the bundle may be dispatched in parallel to respective execution units. Dependencies between instructions cause instructions to be dispatched individually.

In the IA-64 architecture, the specification of which instructions in a bundle can be dispatched in parallel and the types of execution units to which the instructions are dispatched is made in a template. The template specifies a "stop bit" which indicates that any instructions that follow the stop bit cannot be dispatched until the instruction(s) that precede the stop bit have completed. The particular template which is assigned to a bundle by a compiler, for example, depends on the types of instructions in the bundle and dependencies between instructions in the bundle.

The number of bits in the template limits the number of combinations of instruction types and stop bits that can be defined by templates. Thus, where not enough bits are available for all the possible combinations of types of execution units and stop bit positions, the architecture must support execution of all possible sequences of instructions. Even though the templates could be implemented with additional bits to increase the number of combinations of execution unit types and stop bit positions, the resulting processor architecture would not be backwards compatible with software.

To conform an instruction sequence to the available templates, no-op instructions are sometimes inserted in the sequence. A no-op instruction occupies a slot in a bundle that would ordinarily be occupied by an instruction of the type specified for the slot by the template. No-op instructions are dispatched to the execution unit specified by the template. The extra instructions unnecessarily occupy memory space and negatively impact the system's instruction cache and system performance.

A system and method that address the aforementioned problems, as well as other related problems, are therefore desirable.

SUMMARY OF THE INVENTION

In various embodiments, the invention provides a circuit arrangement and method for dispatching computer instructions. In a processor having a plurality of types of execution units, the computer instructions are grouped in bundles, and each bundle includes a plurality of instructions and an associated template index code. Template values are stored in a plurality of template registers, and each template value specifies types of execution units for a bundle of instructions and those instructions in a bundle that are executable in parallel. A dispatch logic circuit is coupled to the template registers and is responsive to an input bundle of instructions and associated index value. The dispatch logic circuit reads a code from a selected one of the plurality of template registers referenced by the index value and issues one or more selected instructions in the bundle to at least one execution unit of a selected type responsive to the code read from the selected one of the plurality of template registers. In another embodiment, the set of template values stored in the registers is selectable to optimize program performance.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Various embodiments of the present invention are described in terms of the IA-64 instruction architecture from Hewlett-Packard. Those skilled in the art will appreciate, however, that the invention could be implemented in other architectures having different types of execution units and different ways of grouping instructions.

Figure 1:
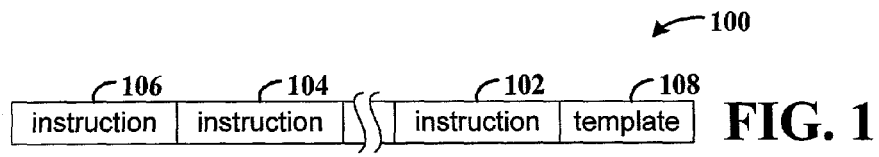
FIG. 1 illustrates an example format of a bundle of computer instructions.

FIG. 1 illustrates an example format for a bundle of computer instructions. In architectures such as the IA-64, for example, instructions are bundled for efficient staging and for parallel dispatching to the execution units. A bundle includes multiple instructions 102, 104, and 106 and a template 108. The number of instructions in a bundle may vary from architecture to architecture. In this description the relative order in which instructions in a bundle are dispatched is right to left, assuming that the instructions are not dispatched in parallel. Thus, if the template 108 specifies a stop bit after instruction 102, then instruction 102 is dispatched first, and the instructions that follow (e.g., 104 and 106) are not dispatched until the cycle after instruction 102 is dispatched.

Figure 2A:
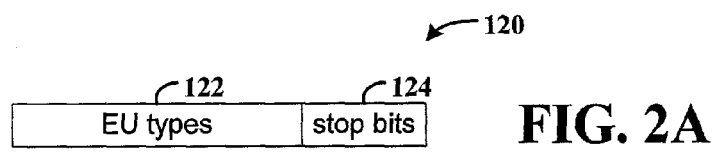
FIG. 2A illustrates and example format of a template.

FIG. 2A illustrates an example format of a template. The template 120 includes one or more codes that alone or in combination specify execution unit (EU) types 122 and stop bits 124. The EU types identify the types of execution units to which each of the instructions in a bundle are to be dispatched. The stop bits essentially indicate which of the instructions in the bundle can be dispatched in parallel. Even though stop bits 124 are shown as being separate from the EU types in the template, in the HP IA64 architecture the stop bits and bits that specify the EU types are intermixed.

Figure 2B:
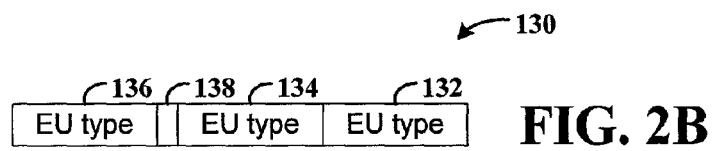
FIG. 2B is a block diagram of an example decoded template.

FIG. 2B is a block diagram of a decoded template 130 for an example three-instruction bundle. EU types 132, 134, and 136 are associated with instructions in corresponding slots in a bundle. Block 138 represents a stop bit. The position of the stop bit indicates that the instructions in the slots of the bundle that correspond to EU types 132 and 134 are dispatched in parallel, and the instruction in the slot that correspond to EU type 136 is not dispatched until the cycle after the first two instructions have been dispatched.

Figure 3A:
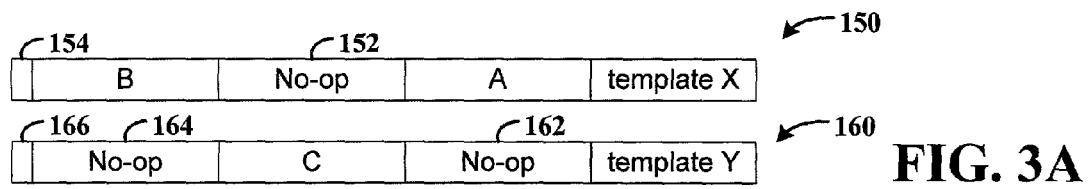
FIG. 3A illustrates two bundles in which no-op instructions have been inserted, and FIG. 3B continues the example of FIG. 3A by showing how the no-op instructions have been eliminated by way of the present invention.
Figure 3B:
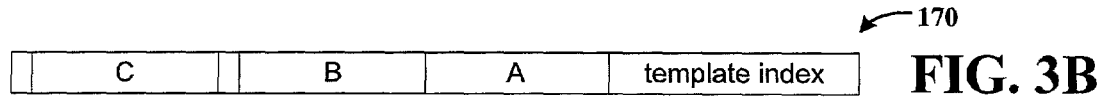

FIG. 3A illustrates two example bundles in which no-op instructions have been inserted, and FIG. 3B continues the example of FIG. 3A by showing elimination of the no-op instructions by way of the present invention. The example assumes an instruction sequence of: instructions A followed by B followed by C. The example further assumes that the number of bits available for a template is insufficient to group all of instructions A, B, and C in one bundle while preserving the required instruction order and respecting instruction dependencies.

The grouping of instructions in FIG. 3A has instructions A and B in bundle 150 and instruction C in bundle 160. Template X controls bundle 150, and template Y controls bundle 160. Bundle 150 has a no-op instruction in slot 152, and bundle 160 has no-op instructions in slots 162 and 164. Stop bits 154 and 166 are placed at the end of bundles 150 and 160, respectively.

Bundles 150 and 160 are constructed under the assumption that the number of bits available in a template is insufficient to define a template that allows all of instructions A, B, and C to be grouped in the same bundle, with a stop bit separating instructions A and B from instruction C, and a stop bit following instruction C.

FIG. 3B illustrates a grouping of instructions A, B, and C in a single bundle 170 and elimination of the no-op instructions in accordance with one embodiment of the present invention. Instead of including the template with a bundle of instructions, a template index value 170 is included in the bundle. The template index value is used to reference one of a group of template registers, where the template values are stored in the template registers. The template registers allow different groups of templates to be used based on processor type and application needs, for example. With a fixed set of templates, all applications are restricted to execution with the same template values, even if a different set of templates would be better suited for the instruction mix of an application. The present invention allows different sets of template values to be used based on the instruction mix of the application. Thus, while no-ops are unlikely to be entirely eliminated, the number of no-ops can be reduced by using different sets of template values for different types of applications.

Figure 4:
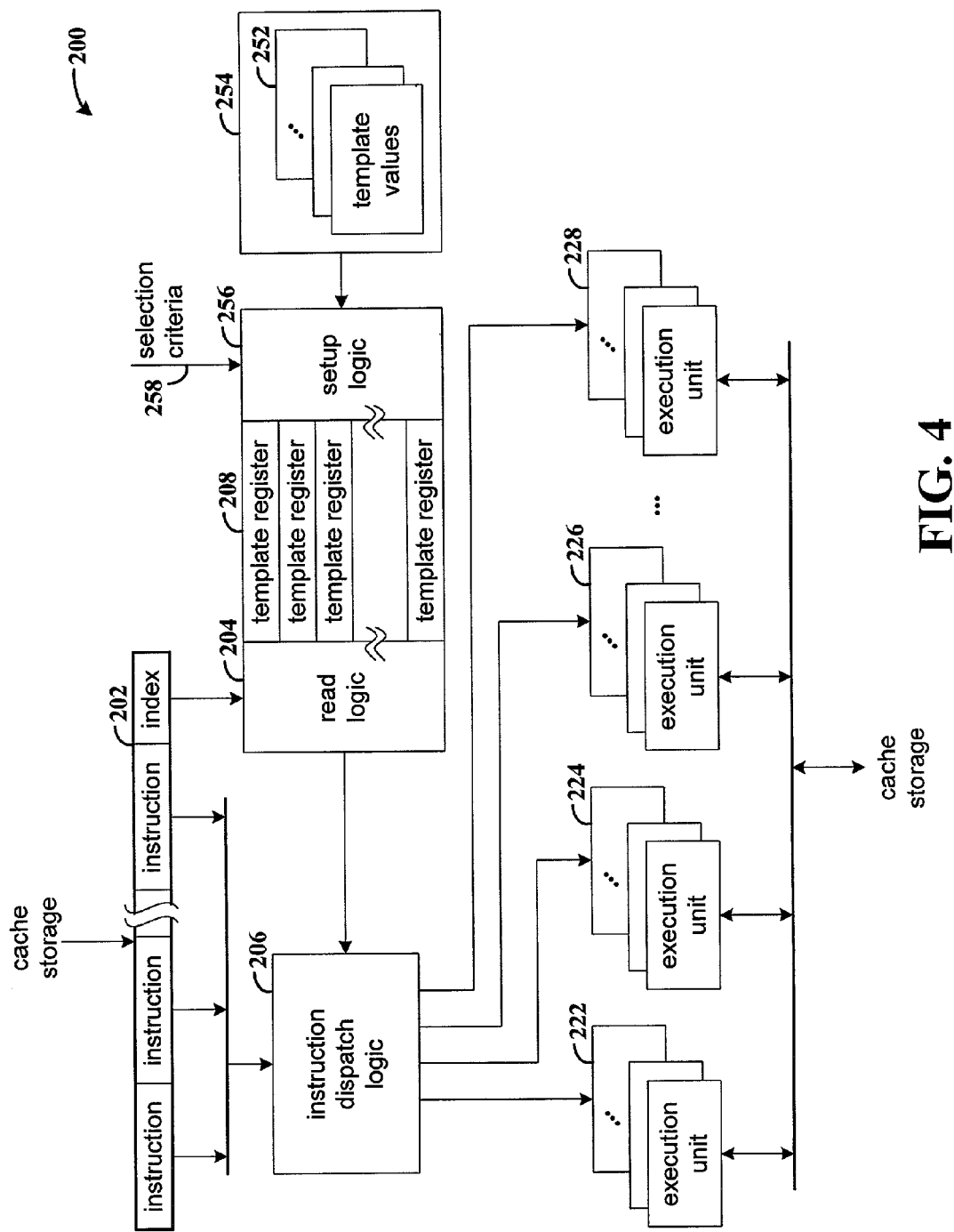
FIG. 4 is a block diagram of a circuit arrangement for processing a bundle of computer instructions in accordance with one embodiment of the present invention.

FIG. 4 is a block diagram of a circuit arrangement 200 for processing a bundle of computer instructions in accordance with one embodiment of the present invention. A bundle of instructions is received from cache storage (not shown) and stored in storage element 202, which in an example embodiment is a register. The bundle includes multiple instructions and a template index value. The template index value is input to read logic circuit 204, and the instructions are input to instruction dispatch logic circuit 206.

Read logic circuit 204 reads the template value from the one of template registers 208 that is referenced by the template index value. The template value is provided as input to instruction dispatch logic circuit 206. Instruction dispatch logic circuit 206 decodes the template value and dispatches the input instructions to execution units as specified by the template value. The dispatch of the instructions is performed as described above with reference to FIGS. 1–3B.

Circuit arrangement 200 includes multiple types of execution units, and multiple execution units of each type. For example, execution units 222 are of a first type, execution units 224 are of a second type, execution units 226 are of a third type, and execution units 228 are of a fourth type. Each of the groups of execution units 222, 224, 226, and 228 includes circuitry (not shown) for further dispatching an input instruction to an available one of the execution units in the group. The execution units also include interfaces to cache storage for input and output of data. It will be appreciated that different architectures will have different types execution units, as well as different numbers of types. In addition, the number of execution units of each type will vary from architecture to architecture.

The template index in combination with the template registers allows the use of different sets of template values. Different sets of template values can be used for applications having different instruction processing needs. In one embodiment, different sets 252 of template values are stored in storage element 254. A selected one of the sets of template values is read by setup logic circuit 256 from the storage element 254 and written to the template registers 208. The selection criteria used by the setup logic circuit in selecting one of the sets of template values are input on signal line 258 and include, for example, a processor type and application type.

The characteristics of storage element 254 are implementation dependent. For example, if a set of template values is loaded once when the system is booted, then the access time is less critical than if the sets of template values are swapped with application programs. Thus, storage element 254 may be any suitable off-chip storage or on-chip storage depending in implementation requirements.

Figure 5:
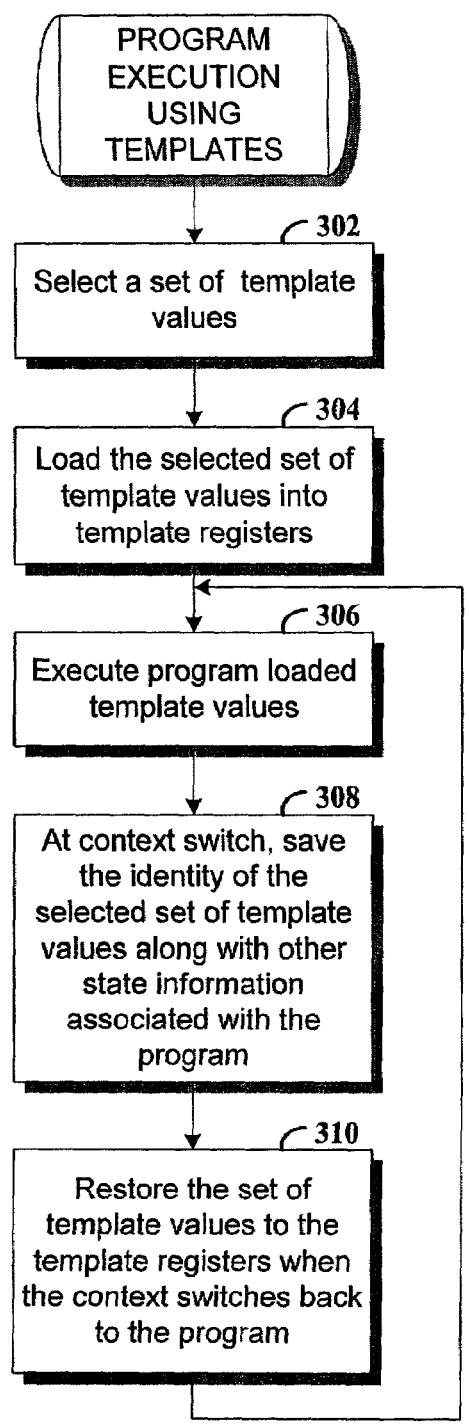
FIG. 5 is a flowchart of an example process for program execution in accordance with another embodiment of the present invention.

FIG. 5 is a flowchart of an example process for program execution in accordance with another embodiment of the present invention. The example process is applicable to an implementation in which sets of template values are selected and swapped as applications are switched for execution. Thus, the set of template values used during execution of a particular application is part of the context data that are saved when the operating systems switches between applications.

When an application program is initially loaded for execution, a set of template values is selected based on the type of application (step 302). Application types and suitable template sets can be constructed based on generally known program analysis techniques. For example, one set of templates may be constructed for scientific applications and another set of templates constructed for database applications. The selected set of template values is then loaded in the template registers (step 304), and the program is executed using the template values (step 306).

Because different application programs may use different sets of template values, the template values used by a program are part of the context data that are saved in a program context switch. It will be appreciated that an identifier code associated with the set of template values can be saved (step 308) instead of storing the entire set of template values.

When the operating system switches context back to a program previously switched out, the set of template values associated with the program to which context is being switched back is restored to the template registers (step 310). Execution of the program then continues (step 306), and the steps of program execution and context switching are repeated until the program is terminated.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit arrangement for dispatching computer instructions in a processor having a plurality of types of execution units, the computer instructions being grouped in bundles, and each bundle including a plurality of instructions and an associated index code, comprising:
   a plurality of template registers, each template register storing a code that specifies types of execution units for a bundle of instructions and those instructions in a bundle that are executable in parallel; and
   a dispatch logic circuit coupled to the plurality of template registers and responsive to an input bundle of instructions and associated index value, the dispatch logic circuit configured to, responsive to a code read from a selected one of the plurality of template registers referenced by the index value, issue one or more selected instructions in the bundle to at least one execution unit of a selected type.

2. The circuit arrangement of claim 1, further comprising:
   a storage element configured with a plurality of sets of template values;
   a setup logic circuit coupled to the storage element and to the plurality of template registers, the setup logic circuit configured to select one of the plurality of sets of template values and load the selected one of the sets of template values into the plurality of template registers.

3. The circuit arrangement of claim 2, wherein each bundle includes a plurality of slots for a plurality of instructions, and each code includes stop bits and sub-codes, wherein the stop bits indicate as between adjacent slots whether instructions are eligible for parallel dispatch, and the sub-codes designate types of execution units for instructions in corresponding slots.

4. The circuit arrangement of claim 3, further comprising a read-logic circuit coupled to the plurality of template registers and to the dispatch logic circuit, the read-logic circuit arranged to read a code from the one of the plurality of template registers referenced by the index value and provide the code to the dispatch logic circuit.

5. The circuit arrangement of claim 1, wherein each bundle includes a plurality of slots for a plurality of instructions, and each code includes stop bits and sub-codes, wherein the stop bits indicate as between adjacent slots whether instructions are eligible for parallel dispatch, and the sub-codes designate types of execution units for instructions in corresponding slots.

6. The circuit arrangement of claim 1, further comprising a read-logic circuit coupled to the plurality of template registers and to the dispatch logic circuit, the read-logic circuit arranged to read a code from the one of the plurality of template registers referenced by the index value and provide the code to the dispatch logic circuit.

7. A circuit arrangement for processing computer instructions, comprising: a plurality of execution units arranged for execution of computer instructions, each execution unit being of a type adapted for execution of a particular type of computer instruction;
   an instruction-bundle register arranged for temporary storage of a bundle of instructions and an index code, the bundle including a plurality of instructions;
   a plurality of template registers, each template register storing a code that specifies types of execution units for a bundle of instructions and those instructions in a bundle that are executable in parallel; and
   a dispatch logic circuit coupled to the instruction-bundle register and to the plurality of template registers, the dispatch logic circuit configured to, responsive to a code read from a selected one of the plurality of template registers referenced by the index value, issue one or more selected instruction in the bundle to at least one execution unit of a selected type.

8. The circuit arrangement of claim 7, further comprising:
   a storage element configured with a plurality of sets of template values;
   a setup logic circuit coupled to the storage element and to the plurality of template registers, the setup logic circuit configured to select one of the plurality of sets of template values and load the selected one of the sets of template values into the plurality of template registers.

9. The circuit arrangement of claim 8, wherein each bundle includes a plurality of slots for a plurality of instructions, and each code includes stop bits and sub-codes, wherein the stop bits indicate as between adjacent slots whether instructions are eligible for parallel dispatch, and the sub-codes designate types of execution units for instructions in corresponding slots.

10. The circuit arrangement of claim 9, further comprising a read-logic circuit coupled to the plurality of template registers and to the dispatch logic circuit, the read-logic circuit arranged to read a code from the one of the plurality of template registers referenced by the index value and provide the code to the dispatch logic circuit.

11. The circuit arrangement of claim 7, wherein each bundle includes a plurality of slots for a plurality of instructions, and each code includes stop bits and sub-codes, wherein the stop bits indicate as between adjacent slots whether instructions are eligible for parallel dispatch, and the sub-codes designate types of execution units for instructions in corresponding slots.

12. The circuit arrangement of claim 7, further comprising a read-logic circuit coupled to the plurality of template registers and to the dispatch logic circuit, the read-logic circuit arranged to read a code from the one of the plurality of template registers referenced by the index value and provide the code to the dispatch logic circuit.

13. A method for dispatching computer instructions in a processor having a plurality of types of execution units, comprising:
   reading a code from a selected one of a plurality of template registers referenced by an index value responsive to receipt of a bundle of computer instructions including a plurality of computer instructions and the index value;

issuing at least one selected instruction in the bundle to at least one execution unit of a selected type responsive to the code read from the selected one of the plurality of template registers.

14. The method of claim 13, further comprising:
selecting one of a plurality of sets of template codes;
reading the selected set of template codes from a storage element; and
loading the selected set into the plurality of template registers.

15. The method of claim 14, wherein each bundle includes a plurality of slots for a plurality of instructions, and each code includes stop bits and sub-codes, wherein the stop bits indicate as between adjacent slots whether instructions are eligible for parallel dispatch, and the sub-codes designate types of execution units for instructions in corresponding slots.

16. The method of claim 13, wherein each bundle includes a plurality of slots for a plurality of instructions, and each code includes stop bits and sub-codes, wherein the stop bits indicate as between adjacent slots whether instructions are eligible for parallel dispatch, and the sub-codes designate types of execution units for instructions in corresponding slots.

17. An apparatus for dispatching computer instructions in a processor having a plurality of types of execution units, comprising:
means for storing a plurality of template codes, each specifying types of execution units for a bundle of instructions and those instructions in a bundle that are executable in parallel;
means, responsive to receipt of a bundle of computer instructions including a plurality of computer instructions and an index value, for reading a selected one of the codes referenced by the index value;
means for issuing at least one selected instruction in the bundle to at least one execution unit of a selected type responsive to the selected code.

* * * * *

UNITED STATES PATENT AND TRADEMARK OFFICE
CERTIFICATE OF CORRECTION

PATENT NO. : 7,139,897 B2
APPLICATION NO. : 10/113074
DATED : November 21, 2006
INVENTOR(S) : Paul Keltcher et al.

It is certified that error appears in the above-identified patent and that said Letters Patent is hereby corrected as shown below:

On the Title page, in field (54), in "Title", in column 1, line 1,
delete "COMPUTER INSTRUCTION DISPATCH" and insert -- COMPUTER INSTRUCTION DISPATCH UTILIZING INSTRUCTION BUNDLE INDEX VALUE TO RETRIEVE ISSUE TEMPLATE SPECIFYING EXECUTION UNIT TYPES FOR INSTRUCTIONS IN BUNDLE --, therefor.

In column 1, line 1, delete "COMPUTER INSTRUCTION DISPATCH" and insert -- COMPUTER INSTRUCTION DISPATCH UTILIZING INSTRUCTION BUNDLE INDEX VALUE TO RETRIEVE ISSUE TEMPLATE SPECIFYING EXECUTION UNIT TYPES FOR INSTRUCTIONS IN BUNDLE --, therefor.

Signed and Sealed this

Twenty-ninth Day of September, 2009

David J. Kappos
*Director of the United States Patent and Trademark Office*